United States Patent
Eichenberg et al.

(10) Patent No.: US 7,687,955 B2
(45) Date of Patent: Mar. 30, 2010

(54) BRAKING DEVICE FOR A CAMSHAFT ADJUSTER

(75) Inventors: Andreas Eichenberg, Chemnitz (DE); Matthias Gregor, Stuttgart (DE); Jens Meintschel, Esslingen (DE)

(73) Assignee: Daimler AG., Stuttgart (DE)

( * ) Notice: Subject to any disclaimer, the term of this patent is extended or adjusted under 35 U.S.C. 154(b) by 652 days.

(21) Appl. No.: 11/601,430

(22) Filed: Nov. 17, 2006

(65) Prior Publication Data

US 2007/0095319 A1 May 3, 2007

Related U.S. Application Data (63) Continuation-in-part of application No. PCT/EP2005/005228, filed on May 13, 2005.

(30) Foreign Application Priority Data

May 19, 2004 (DE) ........................ 10 2004 024 689

(51) Int. Cl.
H02K 7/02 (2006.01)
(52) U.S. Cl. ...................... 310/103; 310/77; 123/90.17
(58) Field of Classification Search .................. 310/77, 310/112–114, 103–105; 123/90.11, 90.15, 123/90.17, 90.31

See application file for complete search history.

(56) References Cited

U.S. PATENT DOCUMENTS

| 6,805,081 | B2 * | 10/2004 | Watanabe et al. | ........ 123/90.17 |
| 6,832,585 | B2 * | 12/2004 | Watanabe | ................ 123/90.17 |
| 2003/0070642 | A1 | 4/2003 | Todo | |

FOREIGN PATENT DOCUMENTS

| DE | 100 37 942 A1 | 3/2001 |
| DE | 199 51 392 A1 | 5/2001 |
| DE | 103 13 864 A1 | 12/2003 |
| DE | 103 24 845 A1 | 1/2004 |

OTHER PUBLICATIONS

Patent Abstracts of Japan Publication No. 2002266607A published Sep. 18, 2002 UNISIA JECS Corp.

* cited by examiner

*Primary Examiner*—Dang D Le
(74) *Attorney, Agent, or Firm*—Klaus J. Bach (57) ABSTRACT

In a braking device for a camshaft adjuster of an internal combustion engine wherein the camshaft adjuster includes at least two adjustment inputs, a respective braking element is provided for each adjustment input to brake the respective adjustment input, the braking elements being operable by an excitation coil arrangement, which, depending on the direction of energization of an excitation coil arrangement, subjects either the one or the other braking element to magnetic flux for initiating braking of the respective adjustment input.

13 Claims, 8 Drawing Sheets

BRAKING DEVICE FOR A CAMSHAFT ADJUSTER

This is a Continuation-In-Part Application of pending international patent application PCT/EP2005/005228 filed May 13, 2005 and claiming the priority of German patent application 10 2004 024 689.0 filed May 19, 2004.

BACKGROUND OF THE INVENTION

The invention relates to a braking device for a camshaft adjuster having at least two adjustment inputs each provided with a braking element.

It is known to use a hysteresis brake in order to brake an adjustment input of a camshaft adjusting device. If an excitation coil of the hysteresis brake is energized, magnetic flux flows through a rotating hysteresis element guided between pole structures of a stator. The hysteresis element, which is moved by the pole structure and is composed of magnetically half-hard material, i.e. a material with a pronounced hysteresis loop in the induction/magnetic field diagram (B/H diagram), is braked by a continuous magnetic field reversal. A hysteresis brake of this type for braking an adjustment input is known, for example, from DE 103 24 845 A1.

On the other hand, an adjusting device with two adjustment inputs is described in DE 102004018942.0. In the case of an adjusting device of this type with more than one adjustment inputs, each adjustment input has to be able to be braked. If a hysteresis brake is therefore provided for each adjustment input, a considerable amount of space is required and a complicated control of the adjusting device and of the braking device is needed.

It is the object of the present invention to provide a braking device for an adjusting device with at least two adjustment inputs, which braking device is as highly compact and can be controlled in a simple manner.

SUMMARY OF THE INVENTION

In a braking device for a camshaft adjuster of an internal combustion engine wherein the camshaft adjuster includes at least two adjustment inputs, a respective braking element is provided for each adjustment input to brake the respective adjustment input, the braking elements being operable by an excitation coil arrangement, which, depending on the direction of energization of an excitation coil arrangement, subjects either the one or the other braking element to magnetic flux for initiating braking of the respective adjustment input.

With such a braking device, the contactlessly operating brake preferably operates with electromagnetic induction; that is it is a hysteresis brake with a braking element in the form of a rotatable ring member or rotatable disk. By means of a magnetic flux introduced into the respective braking element via a pole structure of a stator, a braking torque can be generated in a specific manner in an individual braking element and the adjustment input assigned to the braking element can be braked. The means which can be used are preferably permanent magnets in the manner of a flux valve for the magnetic flux, the permanent magnets interacting in particular with a single excitation coil. Also, two excitation coils may be provided which interact in a suitable arrangement with the common stator, the magnetic flux being guided along different, defined paths in the stator as a function of the direction of energization. Upon appropriate energization, the magnetic flux flows through the one braking element, the braking torque of which rises sharply with increasing electric current applied to the excitation coil device up to a high maximum torque. When the energization polarity is reversed, the flow correspondingly passes through the other braking element. The braking elements are expediently braking elements which are separated from one another and are arranged on a respective rotating support structure, in particular rings or disks consisting of magnetically half-hard material, and forming a type of tandem hysteresis brake.

In particular in the case of an adjusting device designed as a passive, driveless four-shaft gear mechanism, as described in DE 10 2004 018 942.0, in order to adjust the device in one direction, the first adjustment input can be braked and the second adjustment input can be released, and, in order to adjust the device in the opposite direction, the second adjustment input can be braked and the first adjustment input can be released.

According to the invention, the braking elements, which are annular bands (rings) or disks, can be activated as a function of each other. This is advantageous in particular for the abovementioned adjusting device, since, in the case of the latter, an independent control of its two braking elements is not necessary.

Preferably, a partial magnetic circuit is provided per adjustment input, with a stator common to the partial magnetic circuits. This advantageously results in the braking torque being distributed to the individual braking elements during positive and during negative energization of the excitation coil device, so that the activation of the brake is simplified and the construction space required is reduced. Furthermore, the braking device is cost-effective; the simplified design permits the used of the same components to generate the braking torque in either or both braking elements.

In a first preferred refinement, a common excitation coil is provided. A permanent magnet is preferably arranged in each magnetic pitch circle, with the permanent magnets advantageously being arranged axially next to the excitation coil. It is furthermore advantageous if the braking elements are in each case arranged axially next to the excitation coil and the assigned permanent magnet. This design makes it possible to keep the outside diameter of the braking device small. The magnetic flux is used by either of the two braking elements. The permanent magnets with secondary magnetic flux act as valves for the magnetic flux and only allow the latter to pass in each case in one direction. Depending on the direction of energization of the excitation coil, this forces the magnetic flux onto different paths within the braking device. If one braking element in each case is arranged in a different path of the magnetic flux, as a function of the energization one braking element in each case, the polarity of which corresponds to a blocking direction for the current magnetic flux, can block the magnetic flux while the magnetic flux flows through the other braking element. At a certain excitation value, the flux is directly related to the torque generated in the respective braking element.

In a second preferred refinement, the permanent magnets are arranged radially next to the excitation coil. This manner of construction is distinguished by a particularly small axial construction length of the braking device. Depending on the direction of energization of the excitation coil, the magnetic flux is either impeded or assisted by the respective permanent magnet. Thus, a braking torque is only produced in the braking element through which the flow passes while no braking torque is produced in the braking element through which the flow does not pass. An output shaft of the braking device, which output shaft is assigned to the braking element through which the flow passes, or the adjustment input, which is connected thereto, of the adjusting device is accordingly braked.

In a further preferred refinement, one excitation coil is respectively provided per magnetic pitch circle. The excitation coils replace the permanent magnets as valves for the magnetic flux. The excitation coils are preferably spaced apart axially and are accommodated in a common stator. Depending on which excitation coil of the excitation coil device is energized, the flow passes in each case only through the corresponding braking element of the respective magnetic pitch circle, and the magnetic flux for each excitation coil is guided on a different path in the stator.

In an advantageous development, the current flow through the excitation coils is controlled via blocking elements connected electrically in series in each case with the excitation coils. The blocking elements are preferably diodes or switching circuits with a blocking and a passage direction. The braking device can be activated by means of just two electric supply cables, which is cost-effective and has a very advantageous effect on the weight and volume of the braking device. It is particularly space-saving to structurally integrate the blocking elements with the excitation coils.

The braking elements can be cylindrical in the form of annular bands or rings which are in each case guided in an air gap extending in the circumferential direction of the stator and parallel to the axis of symmetry. Alternatively, the braking elements can be disk-shaped and can in each case be guided in an air gap extending perpendicularly with respect to the axis of symmetry of the stator.

The invention will become more readily apparent from the following description with an exemplary embodiment with reference to the accompanying drawings.

DESCRIPTION OF PARTICULAR EMBODIMENTS OF THE INVENTION

In the figures, identical elements or elements which remain essentially the same are numbered by the same reference numbers. In the figures, the terms "radially" and "axially" relate in each case to an orientation with respect to an axis of symmetry or axis of rotation 50.

Figure 1:
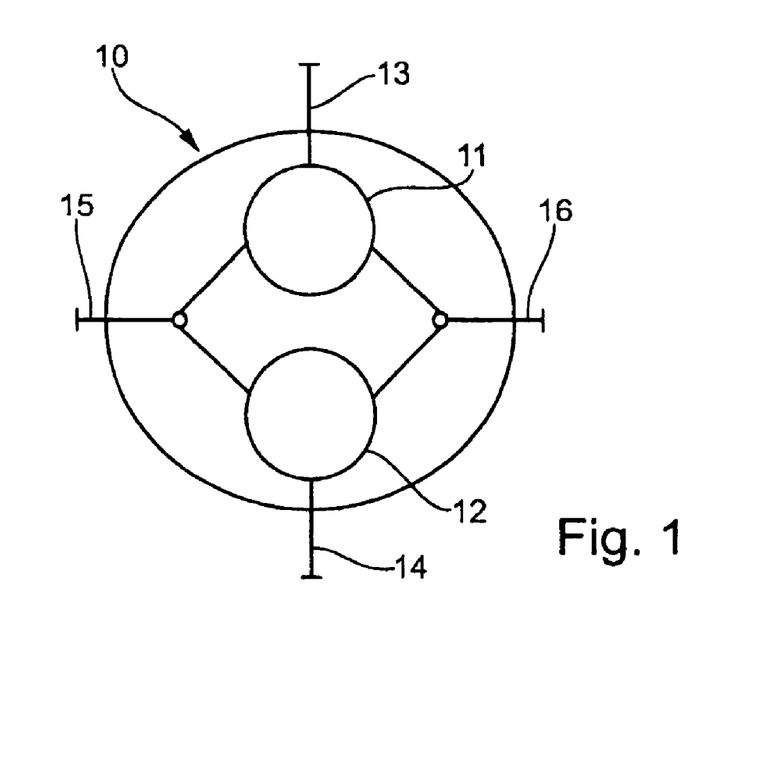
FIG. 1 shows schematically of a preferred four-shaft gear mechanism for adjusting the phase position of a camshaft with two adjustment inputs.

A preferred, particularly compact adjusting device 10 in the form of a four-shaft gear mechanism, in accordance with DE 10 2004 018 942.0 is shown schematically in FIG. 1. The adjusting device 10 has a first and a second adjustment input 13, 14 for two partial gear mechanisms 11, 12, an input for a drive element, which is in the form of a drive wheel 15, and an output for driving a camshaft 16. For adjustment in the one direction, the first adjustment input 13 is braked and the second adjustment input 14 is released; for adjustment in the opposite direction, the second adjustment input 14 is braked and the other adjustment input 13 is released.

The braking device according to the invention operates in accordance with the principle of a hysteresis brake, with one braking element in each case being provided for braking the respective adjustment input 13, 14. In the ideal case, a profile of the magnetic flux and, correspondingly, of the braking torque over an electric excitation current for each braking element is such that, in the first direction of energization of an excitation coil device, the magnetic flux flows through the first braking element, and, in the opposite direction of energization, the magnetic flux flows through the second braking element for generating a corresponding braking torque.

Figure 2:
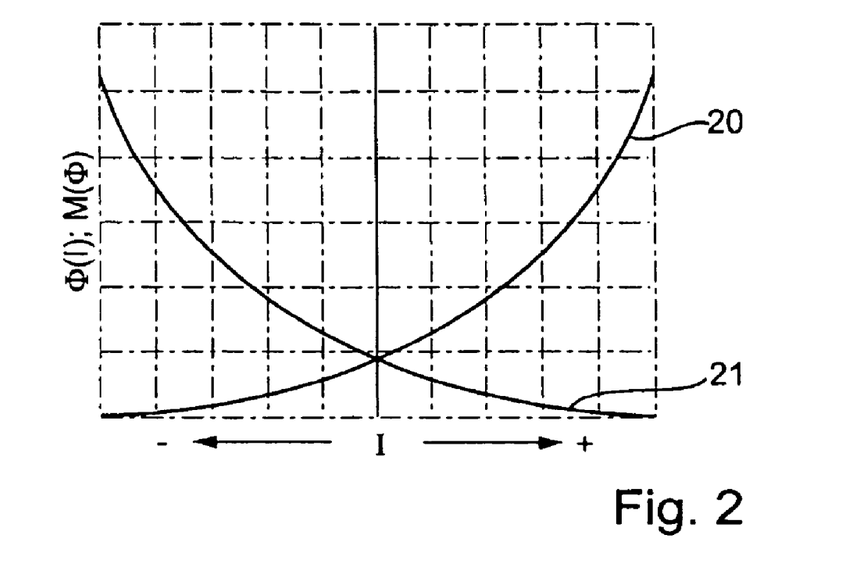
FIG. 2 shows diagrammatically a profile of a magnetic flux as a function of an excitation current for one braking element in each case per adjustment input.

FIG. 2 shows an idealized profile of the flux $\Phi(I)$ or of the braking torque $M(I)$ as a function of the excitation current I. Curve 20 shows a steep rise in the flux $\Phi(I)$ and of the braking torque $M(I)$ as the excitation current I of the first braking element rises while, given the same direction of energization, the second braking element makes virtually no contribution, as can be seen at curve 21. If the direction of energization is reversed, the braking torque $M(I)$ is supplied by the second braking element (curve 21 with negative excitation current I). A profile of the curves 20, 21 that is as steep as possible is sought here.

Figure 3:
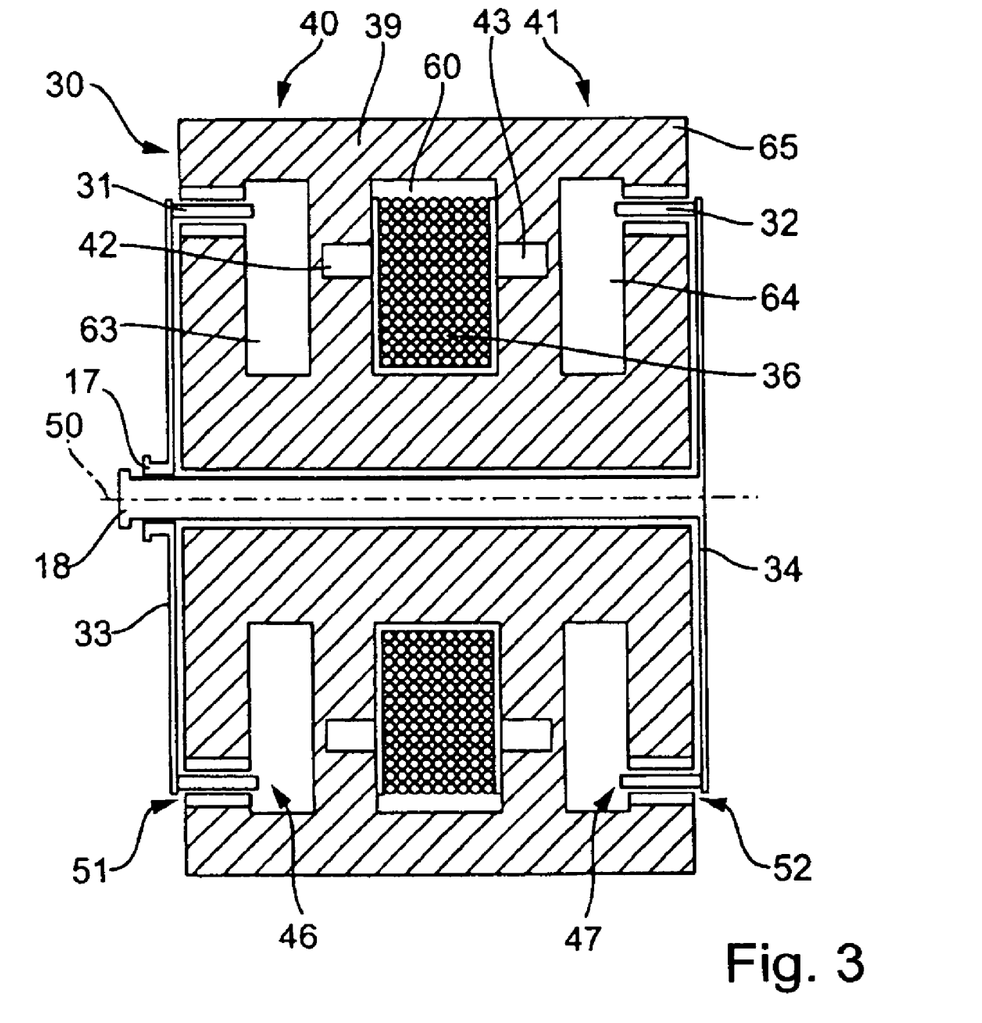
FIG. 3 shows, in section, a first preferred embodiment of a braking device according to the invention with permanent magnets serving as valves for a magnetic flux.

A first preferred refinement of the braking device according to the invention is shown in a sectional illustration in FIG. 3. Details of the adjusting device itself are not illustrated. The braking device 30 contains two braking elements 31, 32, in the form of annular bands, an excitation coil device with an excitation coil 36 and two permanent magnets 42, 43. These elements are arranged within a stator 39 in such a manner that they form two magnetic circuit paths 40, 41. The stator 39 is rotationally symmetrical with respect to an axis of symmetry which coincides with the axis of rotation 50 of two shaft outputs 17, 18.

A support 33 is arranged at the first shaft output 17, at its end facing the input of the braking device 30, which support, on its circumference, carries the first braking element 31, which is designed as a band. A support 34 is arranged at the second shaft output 18, at its end facing the output of the braking device 30, which carries a second braking element 32, in the form of an annular band. The shaft outputs 17, 18 are arranged coaxially and are connected to the coaxially designed adjustment inputs 13, 14 (FIG. 1).

The braking device 30 is formed in a rotationally symmetrical manner with respect to the axis of rotation 50. The braking elements 31, 32, which are in the form of annular bands, respectively are received in air gaps 46 and 47 arranged on the opposite axial ends of the stator 39, with a pole structure including magnetic poles, which are disposed opposite each other, being arranged in the radial direction on both sides of the air gaps 46, 47. The air gaps 46, 47 extend parallel to the axis of rotation 50. An excitation coil 36 which is wound coaxially with respect to the axis of rotation 50 is arranged in a cavity 60 of the stator 39. In the axial direction upstream and downstream of the coil winding, the cavity 60 has a respective end portion in which in each case one of the permanent magnets 42, 43 is arranged. The permanent magnets 42, 43 are magnetized in the same direction. Axially adjacent to the permanent magnets 42, 43, respective further cavities 63, 64, are provided in the stator 39 in communication with the air gaps 46, 47. The air gaps 46, 47 improve the magnetic field distribution by focusing the magnetic flux in the region of the braking elements 31, 32. Depending in each case on the direction of energization of the excitation coil 36, the magnetic flux passes essentially only through one of the braking elements 31 or 32. On the circumferential surface of the braking device 30, the stator 39 has an output part 65 which, at its opposite axial ends, is provided with a part of the pole structure 51, 52 and which covers the cavities 60, 63, 64 and air gaps 46, 47 of the stator 39. In the stator 39, elements, such as the permanent magnets 42, 43, the coil 36 and the braking elements 31, 32, are arranged axially next to one another, which results in an advantageously small outside diameter of the braking device 30. The permanent magnets 42, 43 with secondary magnetic flux serve as valves which allow the flux $\Phi(I)$ only to pass in one direction, as a result of which locally different distributions of flux occur for different directions of energization of the excitation coil 36.

For the function of the individual elements, reference is made below to the preceding figures in order to avoid unnecessary repetitions.

Figure 4:
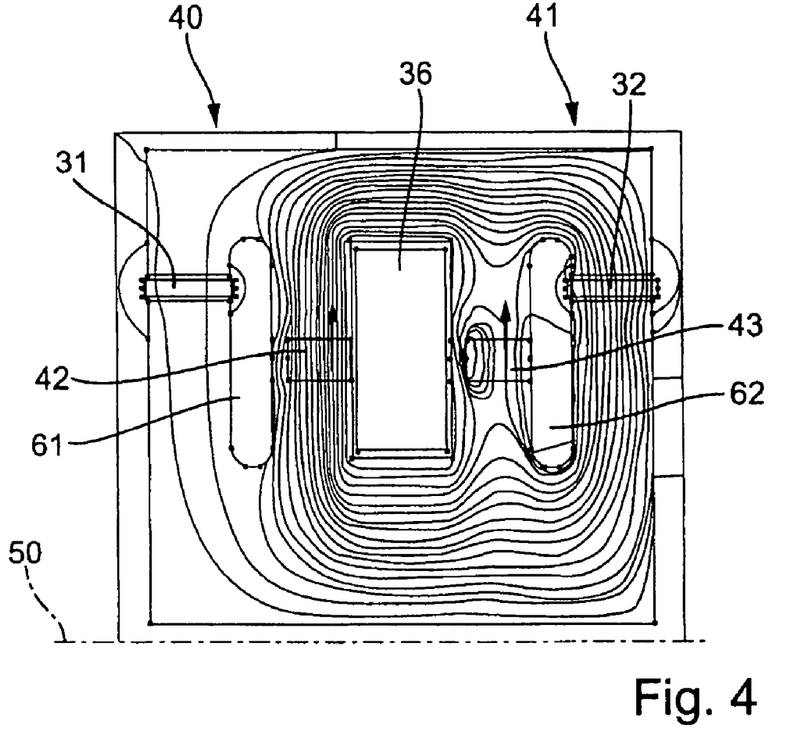
FIG. 4 shows a profile of magnetic field lines in the arrangement of FIG. 3.

A profile of magnetic field lines of the arrangement of FIG. 3 is illustrated in FIG. 4. Only one side of the field profile is illustrated; the arrangement is rotationally symmetrical with respect to the axis of symmetry or axis of rotation 50. The direction of energization of the excitation coil 36 is selected in such a manner that the second permanent magnet 43 blocks and the first permanent magnet 42 assists the magnetic flux, with the result that the flow passes through the second magnetic circuit path 41. As a result, the flow passes through the second braking element 32, and a braking torque $M(I)$ is produced by the latter.

Figure 5:
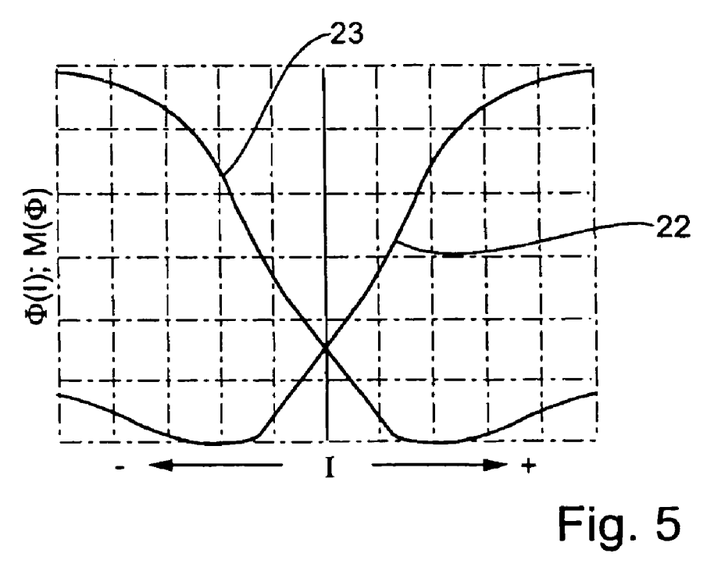
FIG. 5 shows a calculated profile of the magnetic flux or of a braking torque in two braking elements as a function of the excitation current for the arrangement of FIG. 3.

FIG. 5 shows a calculated profile of the magnetic flux $\Phi(I)$ and the braking torque $M(I)$ as a function of the excitation current I through the excitation coil 36 for both braking elements 31, 32. Curve 22 shows the profile for the first braking element 31, curve 23 shows the profile for the second braking element 32. Without excitation current I through the excitation coil 36, magnetic flux $\Phi(I)$ is produced only by the two relatively weak permanent magnets 42, 43. The magnetic flux $\Phi(I)$ is identical at both braking elements 31, 32 and therefore also produces the same braking torque $M(I)$. The curves 22, 23 of the flux $\Phi(I)$ and of the braking torque $M(I)$ have a steep profile and advantageously achieve high maximum values. If the four-shaft gear mechanism mentioned at the beginning is subjected to the same braking torque $M(I)$ at both adjustment inputs 13, 14, no phase adjustment takes place and the phase position of the camshaft relative to the crankshaft remains unchanged.

Figure 6:
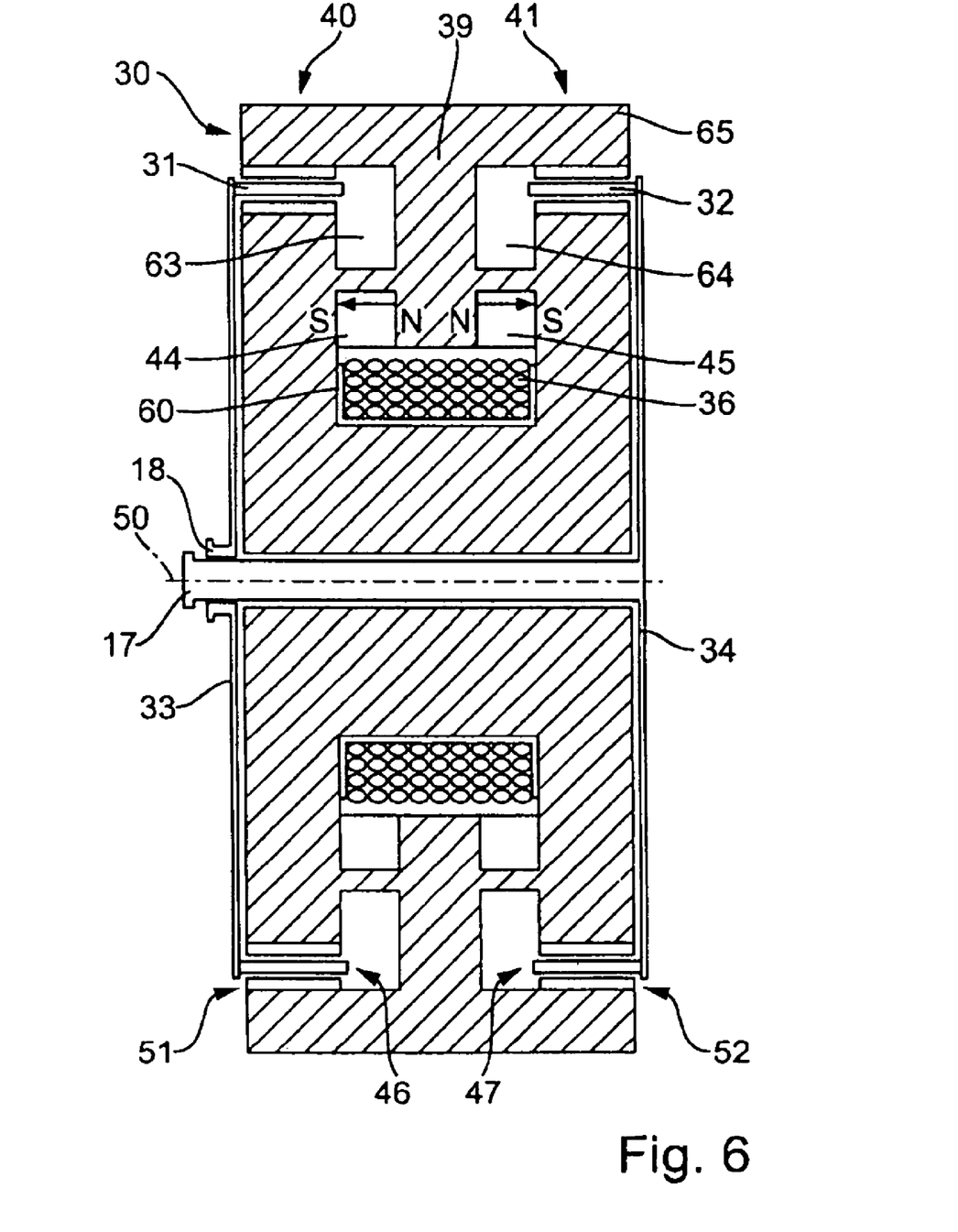
FIG. 6 shows, in section, an alternative preferred embodiment of a braking device with permanent magnets serving as valve for the magnetic flux.

A small construction length can be obtained with the braking device 30 as illustrated schematically in FIG. 6. For the description and function of the individual elements, reference is made to the preceding figures. Starting from a cavity 60, in which an excitation coil 36 is arranged, which includes a winding wound in the circumferential direction, permanent magnets 44, 45 are arranged in end portions which extend radially away from the cavity 60, said permanent magnets being installed coaxially with respect to the axis of rotation 50 and being spaced apart axially from each other opposite. The axial end portions of the magnets 44, 45 in each case coincide with the axial ends of the cavity 60. The permanent magnets 44, 45 are magnetized in the axial direction, the two permanent magnets 44, 45 being magnetized in opposite directions. Two cavities 63, 64 extend away from the end portions in the radial direction toward an outer part 65 which, at its axial ends, forms a part of pole structures 51, 52 and covers the air gaps 46, 47 and the cavities 63, 64 of the stator 39.

Figure 7:
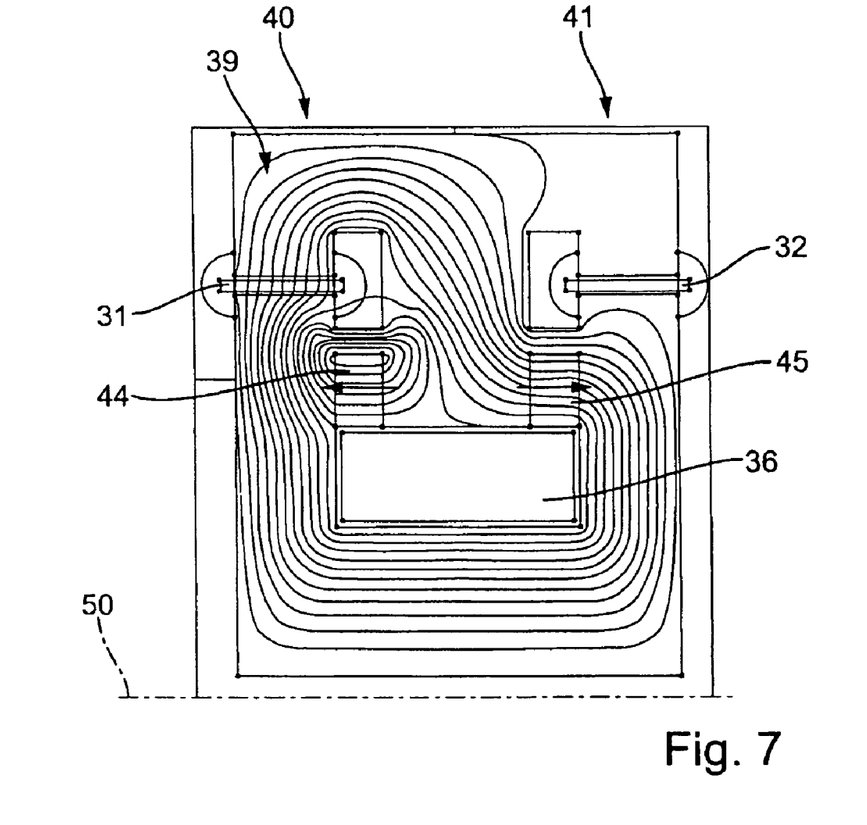
FIG. 7 shows a profile of magnetic field lines in the arrangement of FIG. 6.

An associated flux line profile is explained in FIG. 7. The direction of energization is selected in such a manner that the first permanent magnet 44 blocks and thus forces the magnetic flux into the first braking element 31 while virtually no flow passes through the second braking element 32. The direction of energization is selected in such a manner that the flow passes through the first magnetic circuit path 40. When the direction of current through the excitation coil 36 is reversed, the conditions are reversed.

Figure 8:
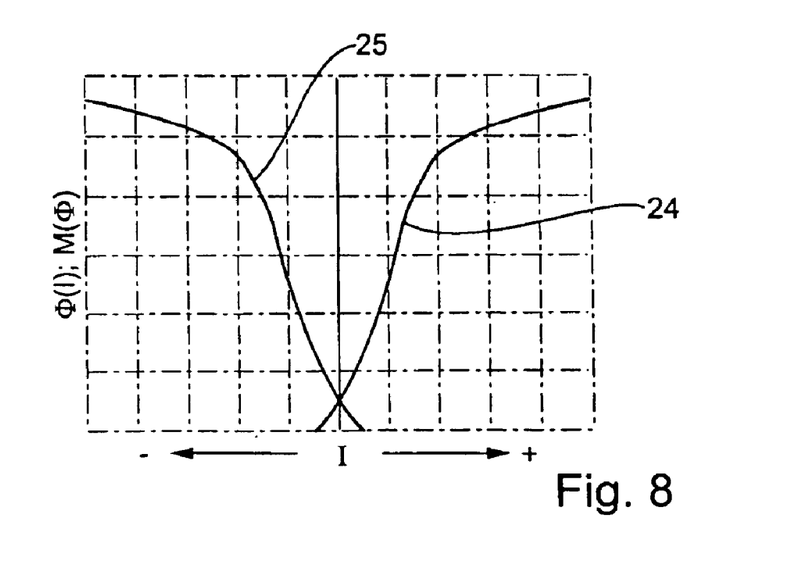
FIG. 8 shows a calculated profile of the magnetic flux or of a braking torque in two braking elements as a function of the excitation current for the arrangement of FIG. 6.

FIG. 8 shows a calculated profile of the magnetic flux $\Phi(I)$ and of the braking torque $M(I)$ as a function of the excitation current I through the excitation coil 36. Curve 24 shows the profile for the first braking element 31, curve 25 shows the profile for the second braking element 32. The curves 24, 25 of the flux $\Phi(I)$ and of the braking torque $M(I)$ have a steep profile and advantageously achieve high maximum values.

Figure 9:
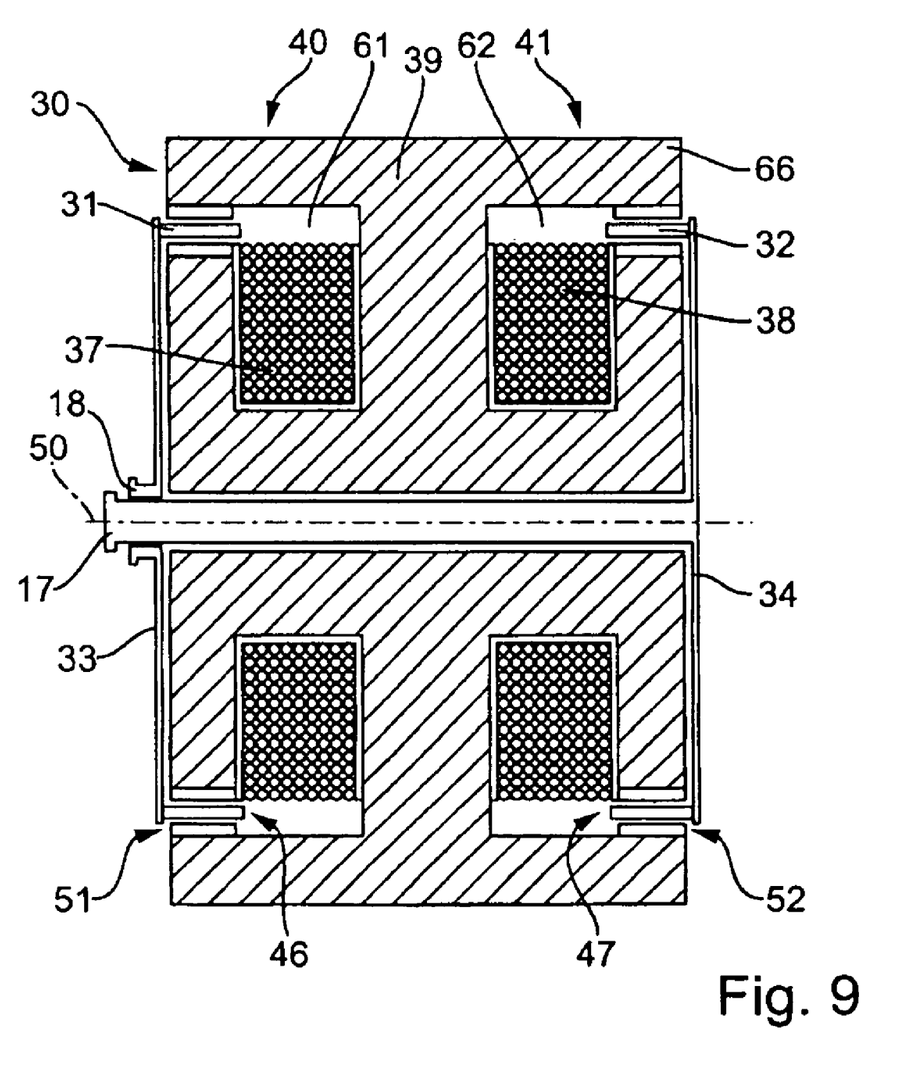
FIG. 9 shows, in section, another preferred embodiment of a braking device according to the invention with two excitation coils and a stator yoke serving as the valve for a magnetic flux.
Figure 10:
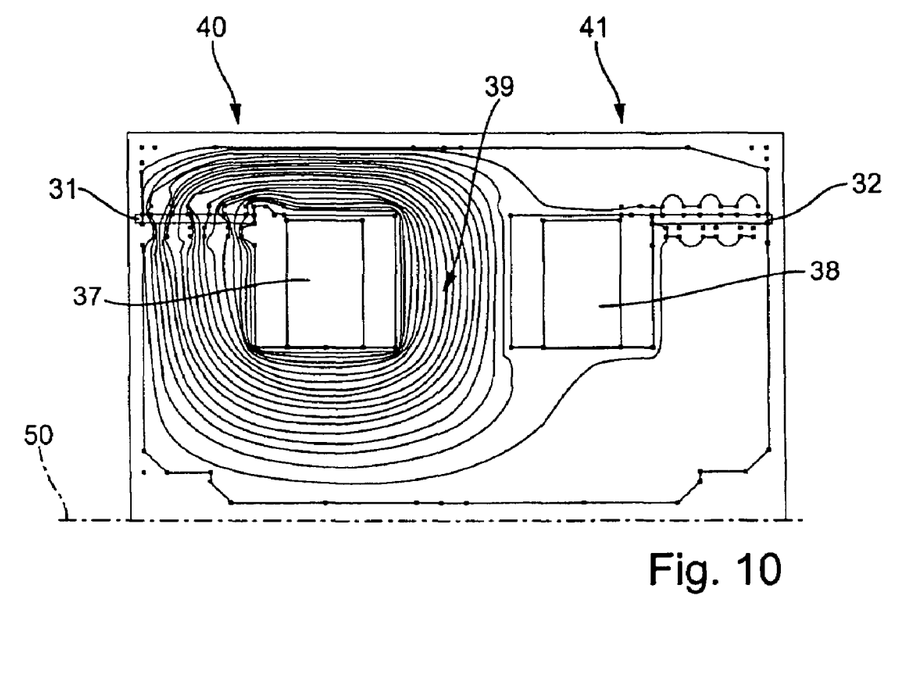
FIG. 10 shows a profile of magnetic field lines in the arrangement in FIG. 9.
Figure 11:
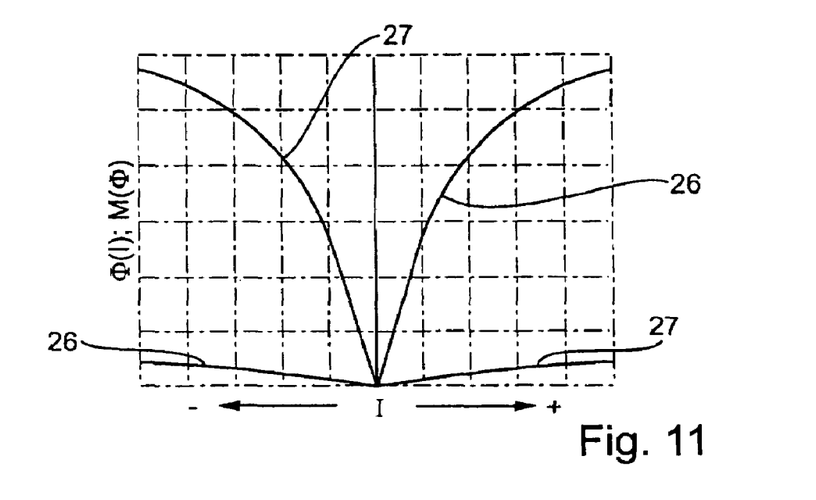
FIG. 11 shows a calculated profile of the magnetic flux or of a braking torque in two braking elements as a function of the excitation current for the arrangement of FIG. 9.

FIG. 9 shows another embodiment of the invention. Instead of permanent magnets acting as flux valves, an excitation coil device with two excitation coils 37, 38, which are arranged in cavities 61, 62 of the stator 39, are provided for controlling a path of the magnetic flux $\Phi(I)$ in a stator 39. The excitation coils 37, 38 are arranged essentially on the same diameter coaxially about an axis of rotation 50 of the braking device 30 and spaced apart axially. The windings of the excitation coils 37, 38 extend in the circumferential direction of the stator 39. On its axial end sides, the stator 39 has air gaps 46, 47 which extend in the axial direction parallel to the axis of rotation 50 and in which a respective braking element 31, 32, in the form of annular bands, are accommodated. The braking elements 31, 32 have a diameter which is slightly larger than the outside diameter of the excitation coils 37, 38. The excitation coils 37, 38 adjoin the braking elements 31, 32 in an axially close-fitting manner. In this embodiment, energization of one of the excitation coils 37 or 38 causes the magnetic flux $\Phi(I)$ to be directed through, in each case, just one braking element 31 or 32. The excitation coils 37, 38 together with their assigned braking elements 31, 32 form magnetic circuit paths 40, 41. The flux paths in the stator 39 are determined solely by the stator 39 and permanent magnets are not required here. If only the first excitation coil 37 is energized, then the magnetic flux also only passes through the first braking element 31. If only the second excitation coil 38 is energized, the flow only passes through the second braking element. FIG. 10 shows the associated flux profile when only the first excitation coil 37 is energized. As in the case of the preceding refinements of the invention, this arrangement also shows an advantageous steep increase in the magnetic flux through the respective braking elements 31, 32 through which the flow passes, when the excitation current I rises. This can be seen in FIG. 11 with reference to the curve 27 for the first braking element 31 and curve 26 for the second braking element 32. The calculated magnetic flux Φ(I) and the braking torque M(I) are plotted here as a function of the excitation current I through the particular excitation coil 37 or 38.

Figure 12:
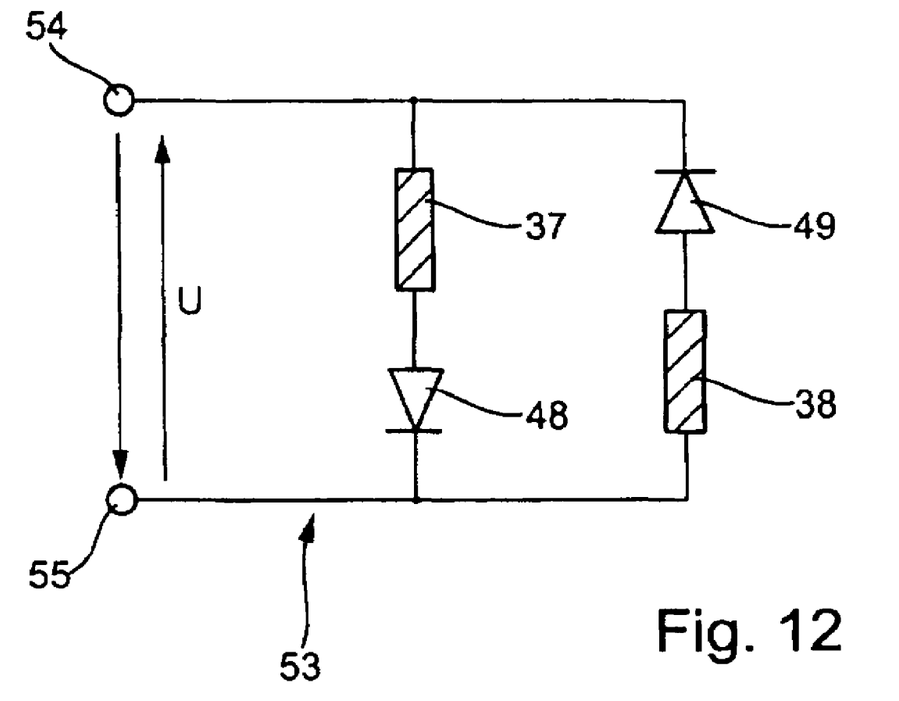
FIG. 12 shows a preferred electric circuit for the activation, as a function of the direction of energization, of in each case one of the excitation coils in the arrangement according to FIG. 9.

Simple activation of the braking device 30 by means of two electric supply lines is possible with a circuit 53 which is sketched in FIG. 12. The circuit 53 is arranged between an activating means (not illustrated) and the braking device 30. An electric voltage U is applied across poles 54 and 55 which supply a voltage to a first circuit branch with a first excitation coil 37 and a first blocking element 48, which is connected electrically in series therewith and is a blocking diode, and, parallel thereto, a second circuit branch with a second excitation coil 38 with a second blocking element 49, which is connected electrically in series therewith and is a blocking diode. The two blocking elements 48, 49 are connected in such a manner that one blocks when the other is switched into the pass-through direction. Accordingly, in a given direction of energization, only one excitation coil 37 or 38 can be energized because the blocking element 49 or 48 in the other circuit branch forms a block. It is particularly advantageous to integrate this circuit directly into the braking device 30.

The refinements according to the invention can be realized both with braking elements 31, 32 in the form of annular bands and with braking elements 31, 32 in the form of as disks. It is also possible to provide one of the braking elements 31, 32 in the form of a disk and the other in the form of an annular band.

A preferred camshaft adjusting device includes a four-shaft gear mechanism with two coaxial adjustment inputs, and also includes the braking device 30 according to the invention with two coaxial shaft outputs 17, 18.

What is claimed is:

1. A braking device for a camshaft adjuster (10) of an internal combustion engine, the camshaft adjuster having at least two adjustment inputs (13, 14), with a respective braking element (31, 32) being provided for each adjustment input (13, 14) for braking the respective adjustment input (13, 14), and means (42, 43, 44, 45, 36, 37, 38, 39, 48, 49) for subjecting either the one or the other braking element (31, 32) to magnetic flux depending on a direction of energization of an excitation coil arrangement (35), a separate magnetic circuit path (40, 41) being provided for each adjustment input (13, 14), with a magnetic flux path in the stator (39) common to both magnetic circuit paths (40, 41).

2. The braking device as claimed in claim 1, wherein such an excitation coil (36) common to both magnetic circuit path (40, 41) is provided.

3. The braking device as claimed in claim 1, wherein a permanent magnet (42, 43, 44, 45) is arranged in each magnetic circuit path (40, 41).

4. The braking device as claimed in claim 3, wherein the permanent magnets (42, 43) are arranged axially next to the excitation coil (36).

5. The braking device as claimed in claim 3, wherein the braking elements (31, 32) are in each case arranged axially next to the excitation coil (36) and the respectively assigned permanent magnet (42, 43).

6. The braking device as claimed in claim 3, wherein the permanent magnets (44, 45) are arranged radially next to the excitation coil (36).

7. The braking device as claimed in claim 1, wherein one excitation coil (37, 38) is respectively provided for each magnetic circuit path (40, 41).

8. The braking device as claimed in claim 7, wherein the excitation coils (37, 38) are spaced apart axially.

9. The braking device as claimed in claim 7, wherein the current flow through the excitation coils (37, 38) is controllable via blocking elements (48, 49) connected electrically in series in each case with the excitation coils (37, 38).

10. The braking device as claimed in claim 9, wherein the blocking elements (48, 49) are structurally integrated with the excitation coils (37, 38).

11. The braking device as claimed in claim 1, wherein shaft outputs (17, 18) for subjecting adjustment inputs (13, 14) to braking torque are arranged coaxially.

12. The braking device as claimed in claim 1, wherein the braking elements (31, 32) are cylindrical and are in each case recessed in an air gap (46, 47) extending in the circumferential direction of the stator (39).

13. The braking device as claimed in claim 1, wherein the braking elements (31, 32) are disk-shaped and are received in each case in an air gap extending perpendicularly with respect to the axis of symmetry of the stator (39).

* * * * *